Oct. 27, 1953 W. KLEEN ET AL 2,657,314

ULTRA SHORT WAVE GENERATOR HAVING A WIDE BAND OF OSCILLATION FREQUENCIES

Filed Nov. 17, 1948 4 Sheets-Sheet 1

Inventors

WERNER KLEEN
OSKAR DOEHLER
HARRY HUBER

By Fritz G. Hochwald
Agent

Inventors
WERNER KLEEN
OSKAR DOEHLER
HARRY HUBER
By [signature]
Agent

Oct. 27, 1953 W. KLEEN ET AL 2,657,314

ULTRA SHORT WAVE GENERATOR HAVING A WIDE BAND OF OSCILLATION FREQUENCIES

Filed Nov. 17, 1948 4 Sheets-Sheet 3

Inventors

WERNER KLEEN
OSKAR DOEHLER
HARRY HUBER

By Fritz G. Hochwald
Agent

INVENTORS:
WERNER KLEEN
OSKAR DOEHLER
BY HARRY HUBER
Fritz G. Hochwald
AGENT:

Patented Oct. 27, 1953 2,657,314

UNITED STATES PATENT OFFICE 2,657,314

ULTRA SHORT WAVE GENERATOR HAVING A WIDE BAND OF OSCILLATION FREQUENCIES

Werner Kleen, Oskar Döhler, and Harry Huber, Paris, France, assignors to Compagnie Generale de Telegraphie Sans Fil, a corporation of France Application November 17, 1948, Serial No. 60,446
In France November 18, 1947

9 Claims. (Cl. 250—36)

The present invention relates to an ultra short wave generator of high power capable of functioning as an oscillator over a relatively large band of frequencies.

The ultra short wave generators, known hitherto, capable of furnishing substantial power are of the magnetron type, but the parameters of their construction impose upon them an operational frequency which is unique especially as a result of their great Q factor.

These magnetrons possess an anode including a series of resonant cavities. Figure 1*a* represents an operational equivalent diagram for such a magnetron; K represents the cathode, supposedly developed, $C_A$ the capacity between anode and cathode and L, C the chain of oscillation circuits constituted by the grid and the anodic cavities; the grid causing a capacity C and the cavities causing an inductance L. Such a circuit operates practically over a single frequency only.

Attempts have been made to make magnetrons "tunable" by mutual deformations of the internal walls, deformations produced by a mechanical arrangement outside the tube, such as would modify the elements L, C, $C_A$, of the above-mentioned circuit.

However, apart from the difficulty of building such tubes, the frequency variation obtained is only of the order of 10% at the utmost.

The invention intends to realize a generator functioning over a frequency range which is much larger than that of the tunable magnetrons mentioned above, while at the same time it offers the advantage of great simplicity in construction.

Another objects of the invention is means external of the tube and permitting a modification in the length of the path of the wave between entrance and exit portions so as to control the phase of the wave.

Another object of the invention is means permitting a regulation of the amplitude of the back coupling. The invention resides in the combination of an evacuated envelope, a cylindrical cathode arranged in the envelope, an anode in the envelope, the anode being shaped as a curved delay line arranged opposite an arc of the cylindrical cathode so as to leave the remaining arc of the cylindrical cathode unopposed by the delay line, the delay line having an input end and an output end allowing an electric wave to be fed to, and withdrawn from, the delay line, respectively, so as to travel along the same, the electric wave having a phase velocity depending on the shape of the anode, a feedback channel arranged outside the envelope and connected to the input end and the output end so as to establish a back-coupling between the output end and the input end, a reactive circuit in the feedback channel, means for tuning the reactive circuit to a predetermined frequency, the predetermined frequency being impressed by the feedback channel on the electric wave traveling along the delay line so as to determine the frequency thereof, means connected to the input and output ends for adjusting the phase of the electric wave fed back by the feedback channel so as to render the phase of the electric wave substantially equal at the input end and the output end, means for establishing an electric field between the anode and the cathode in directions substantially radial to the cylindrical cathode, and means for establishing a magnetic field in the space between the anode and the cathode in directions substantially parallel to the cylindrical cathode, the ratio of the intensities of the electric field and the magnetic field determining the angular velocity of the electrons emitted by the cathode and being chosen so as to render the angular velocity of the electrons substantially equal to the phase velocity of the electric wave. By this means it is obtained that the electrons interact with the electric wave along the arc of the cylindrical cathode opposed by the delay line and continue their path from the output end to the input end of the delay line along the remaining arc of the cylindrical cathode, the electric wave being fed back by the feedback channel from the output end to the input end with equal phases so as the electrons interact again with the electric wave fed back by the feedback channel.

The invention will be more fully understood with the aid of the figures annexed herewith which may serve as examples only but should limit the invention as to the manners of its realization.

Figure 1*b* represents the electrical diagram of an anode utilized in conformance with this invention.

Figure 2 represents a diagram of the principle of the oscillator which is the object of this invention.

Figures 3*a* and 3*b* represent two variations in the realization of the anode mentioned above.

Figure 1A:
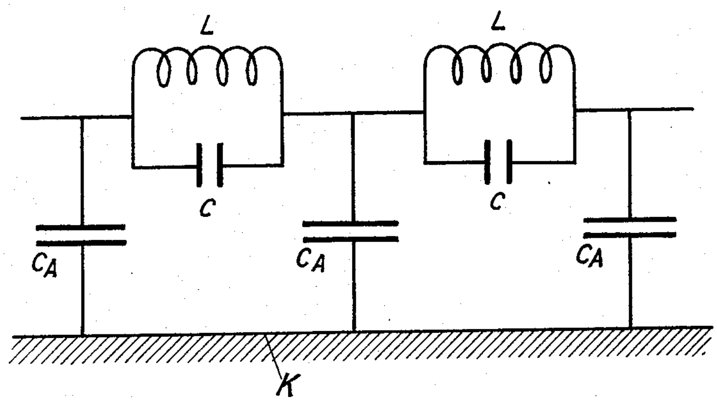
Figure 1B:
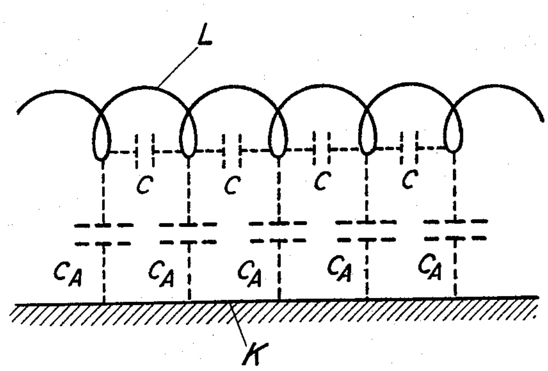

In Figure 1b, L represents a delay line which also serves as an anode and which consists for example of a conductive helix, and K represents again the cathode supposedly developed. Over said line capacity as well as inductance are distributed in a continuous manner. There are represented in dotted lines the various capacities C and $C_A$ appearing in the line, between two successive elements or between the line and the cathode. Such a line operates over a very large band of frequencies.

Figure 2:
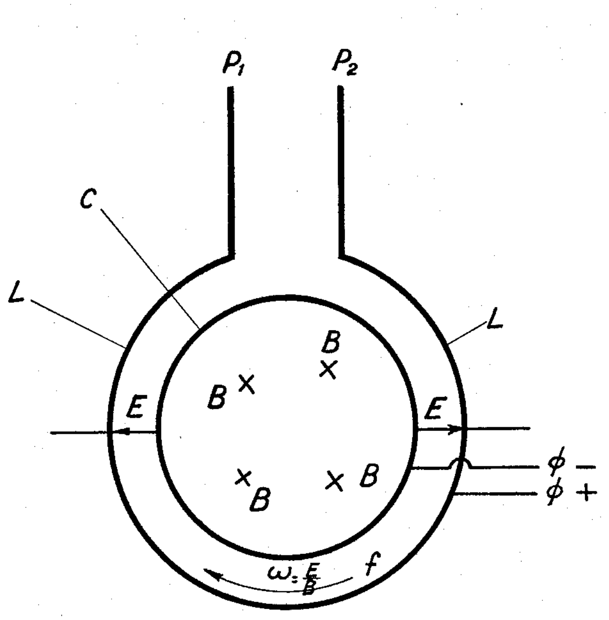

Figure 2 represents a schematical view of an arrangement according to the invention utilizing such a line. In this figure, C represents the cylindrical cathode of the direct or indirect heating type; L is the delay line serving as an anode, and disposed coaxially with respect to that anode. A D. C. voltage is applied between anode and cathode in such a manner as to create a radial electric field E. A magnetic field B is applied parallel to the axis of the cathode and is represented in the figure by crosses. Under the influence of these two fields, the electrons move in the space between anode and cathode in the direction of arrow f with an angular speed of motion which is equal to $$\omega=\frac{E}{B}$$

The delay line should be realized in such a manner that the angular speed of the phase of the progressive wave will just be equal to $\omega$. Under these conditions the exchange of energy between wave and electrons will occur in the most favorable manner.

The two ends of the delay line are taken outside of the tube through two passages $P_1$, $P_2$. In the figure the wall of the tube is not represented nor is there shown the external resonant circuit connected to passages $P_1$ and $P_2$.

Figure 3A:
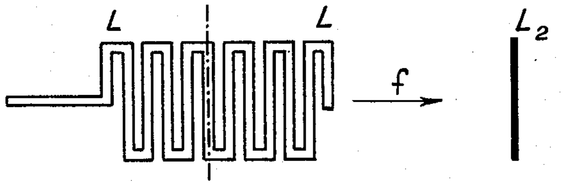
Figure 3B:
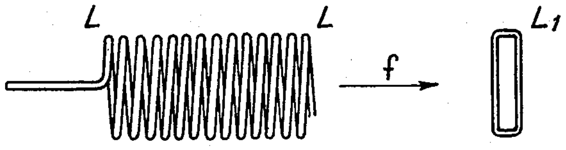

Figures 3a and 3b illustrate two aspects which may be assumed by delay line L.

In Figure 3a, line L is made of sheet metal curved in meander-shaped rectangles. $L_2$ represents a side view from the end. f indicates the direction of the electronic beam.

In Figure 3b, line L consists of wire or sheet metal recurved in the form of a flattened helix, $L_1$ represents a side view from the end following the section. As before f indicates the direction of the electronic beam.

Figure 4:
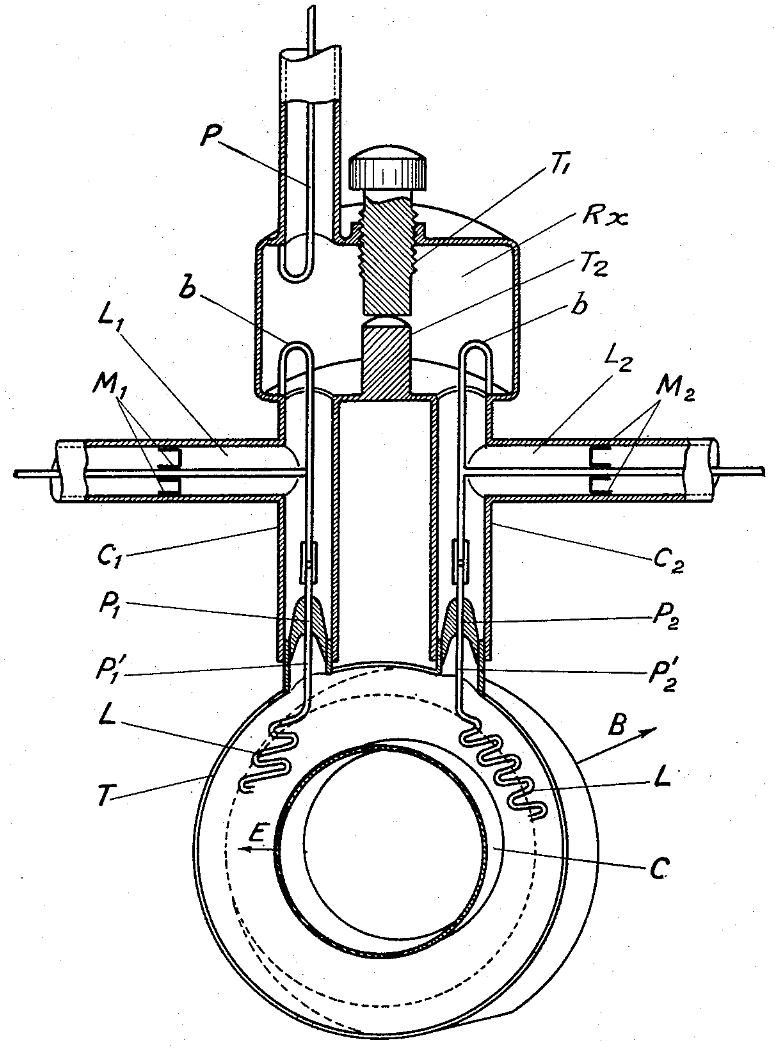
Figure 4 represents a variation in the realization of the wave generator according to the invention.
Figure 5:
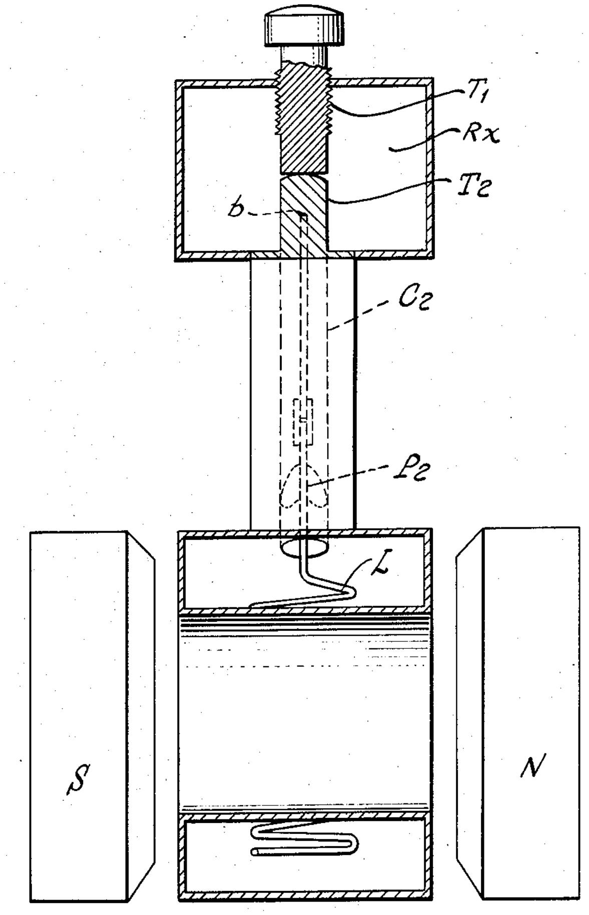
Fig. 5 is a sectional view of the tube shown in Fig. 4, in a plane perpendicular to the plane of the section shown in Fig. 4.

Figs. 4 and 5 show a variation of an embodiment of the invention. There again C is the cathode, L the anode formed by the delay line, B the axial magnetic field produced by a magnet having poles N and S Fig. 5), and E the radial electric field. The ends of line L leave the enclosure T of the tube through passages $P_1$ and $P_2$. These passages are connected by means of two coaxial cables $C_1$ and $C_2$ to a resonant cavity $R_x$ of high Q factor. The resonant frequency of the latter may be modified by a displacement of the conductive massive bolt $T_1$ which is screwed in and traverses the wall of the cavity. The displacement of $T_1$ occurs with respect to the fixed conductive bolt $T_2$. The useful energy is taken off at P.

The arrangement functions as follows: As a result of a voltage shock or a current fluctuation an electromagnetic wave is excited at some point of line L. The electrons moving through the field of the wave give off energy to the latter. When arriving at $P_1'$ the electrons are not subjected to the wave anymore. They continue in their path and when arriving at $P_2'$ are again in the field of the wave wihch has passed from $P_1'$ to $P_2'$ through the intermediary of the resonant cavity $R_x$ and the coaxial cables $C_1$ and $C_2$, forming, due to the Q factor of the cavity, a highly selective resonant circuit. As a result of the selectivity of this circuit, the interaction between electrons and wave cannot continue beyond $P_2'$ except for a frequency included in the pass-band of this circuit. Moreover, the transfer of energy from the electrons to the wave can only occur as the phase of the wave at points $P_1'$ and $P_2'$ is adjusted in such a manner that the electrons which are at $P_1'$ in an ultra-high frequency retarding field, will also be in retarding field at $P_2'$. By appropriate tuning and dephasing of the external circuit, there will be only one wave for which the transfer of energy from the electrons to the wave will take place. Tuning may be modified by mutual displacement of pieces $T_1$ and $T_2$ as already indicated. Dephasing may be obtained by modifying the transit time of the wave between $P_1'$ and $P_2'$. For this purpose, there are arranged in the path of the coaxial cables $C_1$ and $C_2$ two supplementary lines $L_1$, $L_2$ of variable length. These are, for example, two coaxial cables provided with pistons $M_1$ and $M_2$. Normally, for each variation in frequency, a new adjustment of the phase of the wave is necessary. In other words, the detuning of the cavity $R_x$ is necessarily tied up with a variation in length of $L_1$ or $L_2$ without which the oscillator would very quickly disappear.

Finally, the coupling may be realized through the intermediary of loops b. The depth with which these loops penetrate into the resonant cavity determines the relation of the amplitudes of the wave at $P_1'$ and $P_2'$; in other words the depth of penetration of these loops determines the amplitude of the back coupling.

The power of the oscillator is taken off through a capacitive, inductive or mixed coupling at the cavity or at lines connected therewith. In the variation of Figure 4 the energy is taken off over a loop P.

The invention also covers the combination of the generator described with means external to the apparatus which may assume the form of a variable reactance and which are connected to the tuning circuit of the generator in such a manner as to react upon its resonant characteristics. By acting upon these means, the operator is in a position to vary from a distance the tuning of the generator and, thereby, its wavelength. Use may be made, in particular, of a controllable capacitive reactance which may be connected over a coaxial cable to the resonant cavity of the generator. The cable may be disposed with respect to the massive bolt $T_2$ of Figure 4 in such a manner that the reflected capacity of this arrangement acts as a controllable capacity between the solid bolts $T_1$ and $T_2$ and thus replaces the latter.

The invention is not limited to the variations described above but extends equally well to any ultra short wave generator comprising a highly selective external circuit of a controllable resonant frequency and of such character that both the transit time of the wave across this circuit, and the relation of the wave amplitudes at the entrance and the exit of this circuit, may be regulated.

The novel generator is of much simpler construction than the tunable magnetrons known hitherto, because the variation in operation frequency of this generator is obtained by modifying the parameters of a circuit wholly outside of the airproof cover of the tube utilized by the generator. Moreover, such a generator, as already explained, may function over a range of frequencies which is much larger than that of the tunable magnetrons cited above; thus the double purpose of the invention will be well served.

What we claim is:

1. An ultra short wave generator, comprising in combination: an evacuated envelope; a cylindrical cathode arranged in said envelope; an anode in said envelope, said anode being shaped as a curved delay line arranged opposite an arc of said cylindrical cathode so as to leave the remaining arc of said cylindrical cathode unopposed by said delay line, said delay line having an input end and an output end allowing an electric wave to be fed to, and withdrawn from, said delay line, respectively, so as to travel along the same, said electric wave having a phase velocity depending on the shape of said anode; a feedback channel arranged outside said envelope and connected to said input end and said output end so as to establish a backcoupling between said output end and said input end; a reactive circuit in said feedback channel; means for tuning said reactive circuit to a predetermined frequency, said predetermined frequency being impressed by said feedback channel on the electric wave traveling along said delay line so as to determine the frequency thereof; means connected to said input and output ends for adjusting the phase of said electric wave fed back by said feedback channel so as to render the phases of said electric wave substantially equal at said input end and said output end; means for establishing an electric field between said anode and said cathode in directions substantially radial to said cylindrical cathode; and means for establishing a magnetic field in the space between said anode and said cathode in directions substantially parallel to said cylindrical cathode, the ratio of the intensities of said electric field and said magnetic field determining the angular velocity of the electrons emitted by said cathode and being chosen so as to render said angular velocity of the electrons substantially equal to the phase velocity of said electric wave.

2. An ultra short wave generator, comprising in combination: an evacuated envelope; a cylindrical cathode arranged in said envelope; an anode in said envelope, said anode being shaped as a curved delay line arranged opposite an arc of said cylindrical cathode so as to leave the remaining arc of said cylindrical cathode unopposed by said delay line, said delay line having an input end and an output end allowing an electric wave to be fed to, and withdrawn from said delay line, respectively, so as to travel along the same, said electric wave having a phase velocity depending on the shape of said anode; a feedback channel arranged outside said envelope and connected to said input end and said output end so as to establish a backcoupling between said output end and said input end; a cavity resonator in said feedback channel; means for tuning said cavity resonator to a predetermined frequency, said predetermined frequency being impressed by said feedback channel on the electric wave traveling along said delay line so as to determined the frequency thereof; means connected to said input and output ends for adjusting the phase of said electric wave fed back by said feedback channel so as to render the phases of said electric wave substantially equal at said input end and said output end; means for establishing an electric field between said anode and said cathode in directions substantially radial to said cylindrical cathode; and means for establishing a magnetic field in the space between said anode and said cathode in directions substantially parallel to said cylindrical cathode, the ratio of the intensities of said electric field and said magnetic field determining the angular velocity of the electrons emitted by said cathode and being chosen so as to render said angular velocity of the electrons substantially equal to the phase velocity of said electric wave.

3. An ultra short wave generator, comprising in combination: an evacuated envelope; a cylindrical cathode arranged in said envelope; an anode in said envelope, said anode being shaped as a curved delay line arranged opposite an arc of said cylindrical cathode so as to leave the remaining arc of said cylindrical cathode unopposed by said delay line, said delay line having an input end and an output end allowing an electric wave to be fed to, and withdrawn from said delay line, respectively, so as to travel along the same, said electric wave having a phase velocity depending on the shape of said anode; a resonator cavity arranged outside said envelope; wire loops coupling, respectively, said cavity resonator with said input end and said output end of said delay line; means for tuning said cavity resonator to a predetermined frequency, said predetermined frequency being impressed on the electric wave traveling along said delay line so as to determine the frequency thereof; means connected to said wire loops for adjusting the phase of said electric wave, so as to render the phases thereof substantially equal at said input end and said output end; a feedback channel arranged outside said envelope and connected to said input end and said output end so as to establish a backcoupling between said output end and said input end; a reactive circuit in said feedback channel; means for tuning said reactive circuit to a predetermined frequency, said predetermined frequency being impressed by said feedback channel on the electric wave traveling along said delay line so as to determine the frequency thereof; means connected to said input and output ends for adjusting the phase of said electric wave fed back by said feedback channel so as to render the phases of said electric wave substantially equal at said input end and said output end; means for establishing an electric field between said anode and said cathode in directions substantially radial to said cylindrical cathode; and means for establishing a magnetic field in the space between said anode and said cathode in directions substantially parallel to said cylindrical cathode, the ratio of the intensities of said electric field and said magnetic field determining the angular velocity of the electrons emitted by said cathode and being chosen so as to render said angular velocity of the electrons substantially equal to the phase velocity of said electric wave.

4. An ultra short wave generator, comprising in combination: an evacuated envelope; a cylindrical cathode arranged in said envelope; an anode in aid envelope, said anode being shaped as a curved delay line arranged opposite an arc of said cylindrical cathode so as to leave the remaining arc of said cylindrical cathode unopposed by said delay line, said delay line having an input end and an output end allowing an electric wave to be fed to, and withdrawn from said delay line, respectively, so as to travel along the same, said electric wave having a phase velocity depending on the shape of said anode; a cavity resonator arranged outside said envelope; wire loops coupling, respectively, said cavity resonator with said input end and said output end of said delay line; a wire loop extending into said cavity resonator for taking off energy from said cavity resonator; means for tuning said resonant cavity to a predetermined frequency, said predetermined frequency being impressed on the electric wave traveling along said delay line so as to form the frequency thereof; means connected to said wire loops for adjusting the phase of said electric wave, so as to render the phases thereof substantially equal at said input end and said output end; a feedback channel arranged outside said envelope and connected to said input end and said output end so as to establish a backcoupling between said output end and said input end; a reactive circuit in said feedback channel; means for tuning said reactive circuit to a predetermined frequency, said predetermined frequency being impressed by said feedback channel on the electric wave traveling along said delay line so as to determine the frequency thereof; means connected to said input and output ends for adjusting the phase of said electric wave fed back by said feedback channel so as to render the phases of said electric wave substantially equal at said input end and said output end; means for establishing an electric field between said anode and said cathode in directions substantially radial to said cylindrical cathode; and means for establishing a magnetic field in the space between said anode and said cathode in directions substantially parallel to said cylindrical cathode, the ratio of the intensities of said electric field and said magnetic field determining the angular velocity of the electrons emitted by said cathode and being chosen so as to render said angular velocity of the electrons substantially equal to the phase velocity of said electric wave.

5. An ultra short wave generator, comprising in combination: an evacuated envelope; a cylindrical cathode arranged in said envelope; an anode in said envelope, said anode being shaped as a curved delay line formed as a helix and arranged opposite an arc of said cylindrical cathode so as to leave the remaining arc of said cylindrical cathode unopposed by said delay line, said delay line having an input end and an output end allowing an electric wave to be fed to, and withdrawn from said delay line, respectively, so as to travel along the same, said electric wave having a phase velocity depending on the shape of said anode; a feedback channel arranged outside said envelope and connected to said input end and said output end so as to establish a backcoupling between said output end and said input end; a reactive circuit in said feedback channel; means for tuning said reactive circuit to a predetermined frequency, said predetermined frequency being impressed by said feedback channel on the electric wave traveling along said delay line so as to determine the frequency thereof; means connected to said input and output ends for adjusting the phase of said electric wave fed back by said feedback channel so as to render the phases of said electric wave substantially equal at said input end and said output end; means for establishing an electric field between said anode and said cathode in directions substantially radial to said cylindrical cathode; and means for establishing a magnetic field in the space between said anode and said cathode in directions substantially parallel to said cylindrical cathode, the ratio of the intensities of said electric field and said magnetic field determining the angular velocity of the electrons emitted by said cathode and being chosen so as to render said angular velocity of the electrons substantially equal to the phase velocity of said electric wave.

6. An ultra short wave generator, comprising in combination: an evacuated envelope; a cylindrical cathode arranged in said envelope; an anode in said envelope, said anode being shaped as a curved delay line formed as a helix and arranged opposite an arc of said cylindrical cathode so as to leave the remaining arc of said cylindrical cathode unopposed by said delay line, said delay line having an input end and an output end allowing an electric wave to be fed to, and withdrawn from said delay line, respectively, so as to travel along the same, said electric wave having a phase velocity depending on the shape of said anode; a cavity resonator arranged outside said envelope; wire loops coupling, respectively, said cavity resonator with said input end and said output end of said delay line; means for tuning said cavity resonator to a predetermined frequency, said predetermined frequency being impressed on the electric wave traveling along said delay line so as to determine the frequency thereof; means connected to said wire loops for adjusting the phase of said electric wave, so as to render the phases thereof substantially equal at said input end and said output end; a feedback channel arranged outside said envelope and connected to said input end and said output end so as to establish a backcoupling between said output end and said input end; a reactive circuit in said feedback channel; means for tuning said reactive circuit to a predetermined frequency, said predetermined frequency being impressed by said feedback channel on the electric wave traveling along said delay line so as to determine the frequency thereof; means connected to said input and output ends for adjusting the phase of said electric wave fed back by said feedback channel so as to render the phases of said electric wave substantially equal at said input end and said output end; means for establishing an electric field between said anode and said cathode in directions substantially radial to said cylindrical cathode; and means for establishing a magnetic field in the space between said anode and said cathode in directions substantially parallel to said cylindrical cathode, the ratio of the intensities of said electric field and said magnetic field determining the angular velocity of the electrons emitted by said cathode and being chosen so as to render said angular velocity of the electrons substantially equal to the phase velocity of said electric wave.

7. An ultra short wave generator, comprising in combination: an evacuated envelope; a cylindrical cathode arranged in said envelope; an anode in said envelope, said anode being shaped as a curved delay line arranged opposite an arc of said cylindrical cathode so as to leave the remaining arc of said cylindrical cathode unopposed by said delay line, said delay line having an input end and an output end allowing an electric wave to be fed to, and withdrawn from said delay line, respectively, so as to travel along the same, said electric wave having a phase velocity depending on the shape of said anode; a cavity resonator arranged outside said envelope; wire loops coupling, respectively, said cavity resonator with said input end and said output end of said delay line; means for tuning said cavity resonator to a predetermined frequency, said predetermined frequency being impressed on the electric wave traveling along said delay line so as to determine the frequency thereof; coaxial cables connected, respectively, to said wire loops; means for adjusting the effective length of said coaxial cables, thereby adjusting the phase; means connected to said wire loops for adjusting the phase of said electric wave, so as to render the phases thereof substantially equal at said input end and said output end; a feedback channel arranged outside said envelope and connected to said input end and said output end so as to establish a backcoupling between said output end and said input end; a reactive circuit in said feedback channel; means for tuning said reactive circuit to a predetermined frequency, said predetermined frequency being impressed by said feedback channel on the electric wave traveling along said delay line so as to determine the frequency thereof; means connected to said input and output ends for adjusting the phase of said electric wave fed back by said feedback channel so as to render the phases of said electric wave substantially equal at said input end and said output end; means for establishing an electric field between said anode and said cathode in directions substantially radial to said cylindrical cathode; and means for establishing a magnetic field in the space between said anode and said cathode in directions substantially parallel to said cylindrical cathode, the ratio of the intensities of said electric field and said magnetic field determining the angular velocity of the electrons emitted by said cathode and being chosen so as to render said angular velocity of the electrons substantially equal to the phase velocity of said electric wave.

8. An ultra short wave generator, comprising in combination: an evacuated envelope; a cylindrical cathode arranged in said envelope; an anode in said envelope, said anode being shaped as a curved delay line formed as a helix and arranged opposite an arc of said cylindrical cathode so as to leave the remaining arc of said cylindrical cathode unopposed by said delay line, said delay line having an input end and an output end allowing an electric wave to be fed to, and withdrawn from said delay line, respectively, so as to travel along the same, said electric wave having a phase velocity depending on the shape of said anode; a cavity resonator arranged outside said envelope; wire loops coupling, respectively, said cavity resonator with said input end and said output end of said delay line; means for tuning said cavity resonator to a predetermined frequency, said predetermined frequency being impressed on the electric wave traveling along said delay line so as to determine the frequency thereof; coaxial cables connected, respectively, to said wire loops; means for adjusting the effective length of said coaxial cables, thereby adjusting the phase; means connected to said wire loops for adjusting the phase of said electric wave, so as to render the phases thereof substantially equal at said input end and said output end a feedback channel arranged outside said envelope and connected to said input end and said output end so as to establish a backcoupling between said output end and said input end; a reactive circuit in said feedback channel; means for tuning said reactive circuit to a predetermined frequency, said predetermined frequency being impressed by said feedback channel on the electric wave traveling along said delay line so as to determine the frequency thereof; means connected to said input and output ends for adjusting the phase of said electric wave fed back by said feedback channel so as to render the phases of said electric wave substantially equal at said input end and said output end; means for establishing an electric field between said anode and said cathode in directions substantially radial to said cylindrical cathode; and means for establishing a magnetic field in the space between said anode and said cathode in directions substantially parallel to said cylindrical cathode, the ratio of the intensities of said electric field and said magnetic field determining the angular velocity of the electrons emitted by said cathode and being chosen so as to render said angular velocity of the electrons substantially equal to the phase velocity of said electric wave.

9. An ultra short wave generator, comprising in combination: an evacuated envelope; a cylindrical cathode arranged in said envelope; an anode in said envelope, said anode being shaped as a curved delay line formed as a helix and arranged opposite an arc of said cylindrical cathode so as to leave the remaining arc of said cylindrical cathode unopposed by said delay line, said delay line having an input end and an output end allowing an electric wave to be fed to, and withdrawn from said delay line, respectively, so as to travel along the same, said electric wave having a phase velocity depending on the shape of said anode; a cavity resonator arranged outside said envelope; wire loops coupling, respectively, said cavity resonator with said input end and said output end of said delay line; a wire loop extending into said cavity resonator for taking off energy from said cavity resonator; means for tuning said cavity resonant to a predetermined frequency, said predetermined frequency being impressed on the electric wave traveling along said delay line so as to determine the frequency thereof; coaxial cables connected, respectively, to said wire loops; means for adjusting the effective length of said coaxial cables, thereby adjusting the phase; means connected to said wire loops for adjusting the phase of said electric wave, so as to render the phases thereof substantially equal at said input end and said output end; a feedback channel arranged outside said envelope and connected to said input end and said output end so as to establish a backcoupling between said output end and said input end; a reactive circuit in said feedback channel; means for tuning said reactive circuit to a predetermined frequency, said predetermined frequency being impressed by said feedback channel on the electric wave traveling along said delay line so as to determine the frequency thereof; means connected to said input and output ends for adjusting the phase of said electric wave fed back by said feedback channel so as to render the phases of said electric wave substantially equal at said input end and said output end; means for establishing an electric field between said anode and said cathode in directions substantially radial to said cylindrical cathode; and means for establishing a magnetic field in the space between said anode and said cathode in directions substantially parallel to said cylindrical cathode, the ratio of the intensities of said electric field and said magnetic field determining the angular velocity of the electrons emitted by said cathode and being chosen so as to render said angular velocity of the electrons substantially equal to the phase velocity of said electric wave.

WERNER KLEEN.
OSKAR DÖHLER.
HARRY HUBER.

References Cited in the file of this patent

UNITED STATES PATENTS

| Number | Name | Date |
|---|---|---|
| 1,978,021 | Hollmann | Oct. 23, 1934 |

| Number | Name | Date |
|---|---|---|
| 2,087,737 | Runge | July 20, 1937 |
| 2,367,295 | Llewellyn | Jan. 16, 1945 |
| 2,368,031 | Llewellyn | Jan. 23, 1945 |
| 2,440,089 | Haeff | Apr. 20, 1948 |
| 2,566,087 | Lerbs | Aug. 28, 1951 |

OTHER REFERENCES

Article by Brossart and Doehler, pp. 328–338, Annales de Radio-electricite vol. III, No. 14, Oct. 1948.